United States Patent Office 2,948,145
Patented Aug. 9, 1960

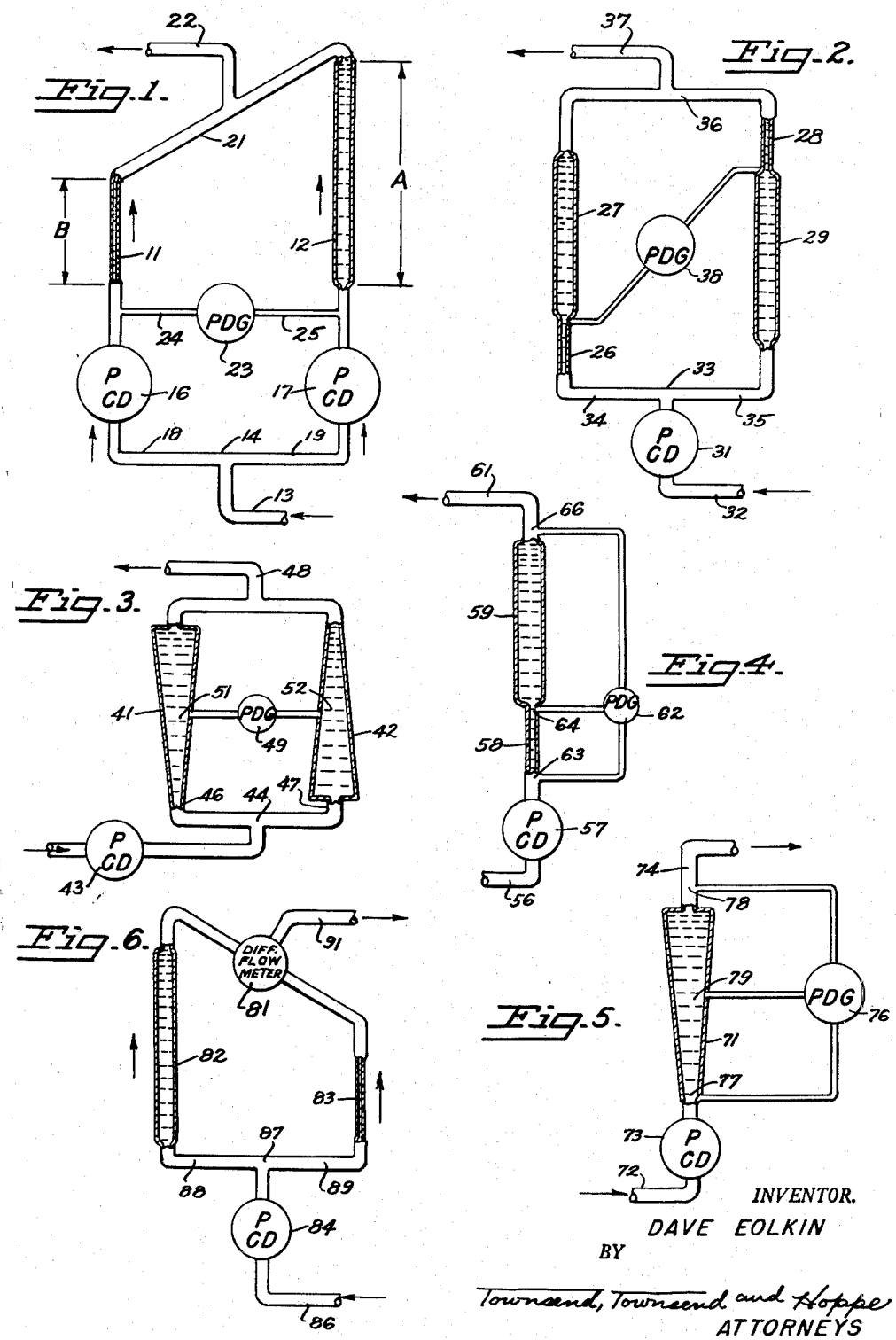

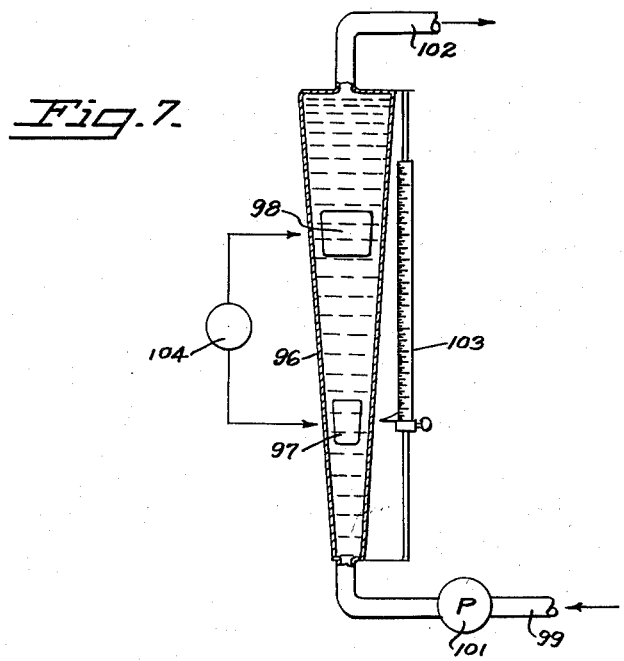
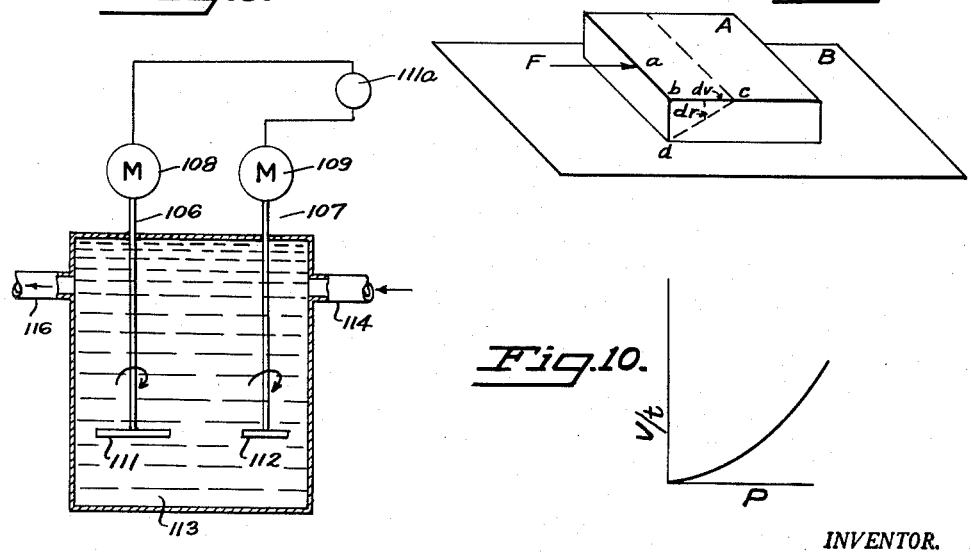

2,948,145

CONTINUOUS CONSISTOMETER AND METHOD OF MEASURING LIQUIFORM PRODUCT CONSISTENCY CONTINUOUSLY

Dave Eolkin, San Lorenzo, Calif., assignor to Gerber Products Company, Fremont, Mich., a corporation of Michigan Filed May 21, 1954, Ser. No. 431,441

34 Claims. (Cl. 73—54)

This invention relates to a new and improved continuous consistometer and method of measuring liquiform product consistency continuously. The invention is concerned with rheological measurements of industrial products such as pureed and formulated foods where it is desirable, from the standpoint of manufacturing controls, to obtain continuous readings and control of the consistency of the product so that standards of uniformity may be maintained. Thus, the present invention is useful in obtaining a continuous measurement of the consistency of a product flowing through a pipe from a processing tank to a can filling machine, for example.

For the purpose of this invention, liquids may be classified in two types, namely, Newtonian liquids and non-Newtonian liquids. A Newtonian liquid may be defined as one in which the viscosity does not vary with the rate of shear within the non-turbulent flow range whereas a non-Newtonian liquid is one in which the viscosity is variable with the rate of shear in a non-turbulent flow range. Newtonian liquids comprise such materials as water, gasoline, glycerin, mineral oils, etc., whereas non-Newtonian liquids comprise food purees, starch jells, lubricating greases, printing inks, clay suspensions, paints, etc. In the latter types of liquids, when viscosity is plotted as a function of rate of shear, a curve is produced rather than a straight line. When viscosity of Newtonian liquids is plotted as a function of rate of shear, a straight line is produced. The "rate of shear" is a concept which may be defined as follows: Let it be assumed that there are two parallel planes of infinite length A and B, spaced apart a distance "$bd$," the intervening space being filled with the liquid under test. A tangential shearing stress is applied parallel to plane A immediately adjacent plane A. (See Fig. 9.) The A plane then moves with respect to B, carrying with it the innumerable parallel planes of liquid existing between A and B. Each plane however, is carried a different distance, the top plane A moving farthest with respect to the bottom plane B, which remains stationary. When point "$b$" in the A plane reaches point "$c$," after the shearing stress is applied for a given time interval, the distance between $b$ and $c$ divided by the time interval gives the velocity of A with respect to B. The distance $bc$ divided by the distance $bd$ (the distance between the two planes) becomes the rate of shear. This is customarily written as $$\frac{dv}{dr}$$

where $v$ is velocity and $r$ is a distance between the planes. The foregoing definition is based upon "Industrial Rheology and Rheological Structures" by Henry Green, John Wiley & Sons, Inc., 1949. The definition of other terms used in this description of the invention will be based in large part upon that work.

A typical consistency curve for a non-Newtonian fluid is shown in Fig. 10 and illustrates the importance of multi-point plotting to establish the curve. V/t is the volume of flow per second. P is the activating pressure.

A common continuous viscometer measures the viscosity of a liquid only at one rate of shear, although in non-Newtonian liquids the viscosity is a variable depending upon the rate of shear.

Other laboratory instruments have been designed and built for the purpose of measuring the flow characteristics of non-Newtonian liquids. These instruments have actually measured the viscosity at different rates of shear by varying the rate of shear manually or automatically through a predetermined range and simultaneously measuring viscosity manually or automatically and thus produce "multi-point" measurements. Such instruments are, however, not adaptable to continuous operation, as when it is desired continuously to record and control consistency of a product going through a pipe. The present invention accomplishes the latter result.

In the hereinafter described method of measuring the viscosity at different rates of shear, instruments are described at which the viscosity is measured continuously at two different rates of shear but it will be understood that where necessary viscosity measurements at additional rates of shear may be obtained by modification of the equipment. For many purposes computation of two points on the curve is satisfactory and hence the invention is described herein as applied to two-point measurement.

Other objects of the present invention will become apparent upon reading the following specification and referring to the accompanying drawings in which similar characters of reference represent corresponding parts in each of the several views.

In the drawings:

Figs. 1 to 8, inclusive, are schematic views of various modifications of continuous consistometers, the exact details of which are hereinafter described.

Fig. 9 is a schematic view illustrating graphically the concept of "rate of shear."

Fig. 10 is a typical consistency curve for a non-Newtonian liquid.

In Fig. 1 two capillary tubes 11 and 12 of different lengths and different diameters are shown. The product entering through pipe 13 branches at T14 and is pumped by two constant-volume pumps 16 and 17 of identical capacity through branches 18 and 19 in which are installed the tubes 11 and 12, respectively, the discharge from the branches being brought together through conduit 21 and discharged through pipe 22. Although not essential to the invention, it is desirable that the diameters and lengths of the two tubes 11 and 12 be such that if the fluid passing therethrough were a Newtonian fluid the viscous resistance of each tube would be identical. Thus, the viscous resistance on the shorter tube 11 being greater per inch of length than in the longer tube 12, the relative lengths are adjusted so that the total resistances are equal. A pressure differential gauge 23 is installed with leads 24 and 25 to the bases of the two tubes 11 and 12. Assuming now that the fluid were a Newtonian fluid, and that the tubes 11 and 12 were matched and dimensioned so that their viscous resistances were identical, then the pressure gauge 23 would show equal pressures in the tubes. However, for a non-Newtonian fluid a pressure differential develops for the reason that the viscosity does not vary directly with the rate of shear. Upon calibration of the gauge 23, the consistency of the fluid flowing through pipe 13 can be determined. Change in reading of gauge 23 indicates to the attendant that change in the consistency of the product has occurred, requiring adjustment of the processing conditions.

In Fig. 2 a different arrangement of capillary tubes is shown, although the result is substantially the same.

On one side of the device are two tubes 26 and 27 joined end to end, tube 26 being of small diameter and the tube 27 of larger diameter. The corresponding tubes 28 and 29 on opposite sides are identical but reversed in position. The diameters and lengths of the tubes are such that the viscous resistance for a Newtonian liquid in small tube 26 or 28 would equal that in large tube 27 or 29. A single constant volume pump 31 is employed in the system shown in Fig. 2, the fluid entering through pipe 32 being pumped through pump 31 and divided at T33 to flow equally through the two branches 34 and 35 having identical viscous resistances and joined together at the outlet 36 and carried off by discharge pipe 37. A pressure differential gauge 38 is installed to compute the difference in pressure between the top of the small tube 36 on one side and the top of the large tube 29 on the other side. Here again, for Newtonian liquids the pressure differential would read zero but for non-Newtonian liquids a pressure differential develops and is indicated on the gauge.

In Fig. 3, two identical tapered capillary tubes 41 and 42 are employed, the two tubes being reversed in direction. A single constant-volume pump 43 is employed and the discharge of the pump is divided at T44 equally into the two branches 46 and 47 and the discharge from the tapered tubes 41 and 42 is brought together and discharged through a single pipe 48. A pressure differential gauge 49 is installed to measure the pressure at the median viscous resistance points 51 and 52 in the two tubes (assuming that Newtonian fluids were flowing therethrough). When non-Newtonian fluids are employed, the fact that the viscosity is not a direct function of the rate of shear results in a greater (or lesser) viscous resistance at point 51 than at point 52, which is reflected in a gauge reading of the differential pressure gauge 49.

Heretofore, in Figs. 1 to 3, inclusive, two branches have been employed into which the flow is divided, the volume of flow through each branch being identical. In Fig. 4, a single line of flow is employed. The fluid enters through pipe 56 and is pumped by pump 57, first through small diameter capillary tube 58 and thence through large diameter capillary tube 59, the tubes 58 and 59 being connected end to end, and thence out through pipe 61. A pressure differential gauge 62 is employed which measures the difference in the pressure differentials between points 63 (at the bottom of tube 58) and 64 (at the connection between tubes 58 and 59) and between points 64 and 66 (at the top of tube 59). The diameters and lengths of the capillaries 58 and 59 are such that for Newtonian fluids the viscous resistance of the two tubes is equal, it being understood that this is a desirable but not essential feature of the invention.

In Fig. 5 a single flow is employed but a tapered capillary 71 is used. Thus, the fluid is pumped from conduit 72 by pump 73 through the tapered tube 71 and is discharged through pipe 74. A pressure differential gauge 76 is employed which is connected to three points; namely, point 77 at the bottom of the tube, point 78 at the top of the tube and point 79 at the median viscous resistance point for a Newtonian fluid. When a non-Newtonian fluid is employed, a pressure differential is recorded on the gauge 76.

In the modifications of Figs. 1 to 5, inclusive, the consistency has been measured by measurement of difference in pressure. In Fig. 6 a differential flowmeter 81 is employed which measures the difference in flow. Thus, capillaries 82 and 83 are employed, it being desirable, though not essential, that the diameters and lengths of the tubes 82 and 83 be such that the viscous resistance through each is identical for a Newtonian fluid. Constant volume pump 84 draws product from pipe 86 and flow is divided at T87 into two branches 88 and 89, one of the two tubes 82 and 83 being in each branch. The discharge of the tubes passes through flowmeter 81 and out through pipe 91. For a Newtonian fluid, the viscous resistance of the two capillaries 82 and 83 being identical, the flow through each branch 88 and 89 will be identical. However, for a non-Newtonian fluid, the viscous resistance not being proportional to the rate of shear, a difference in flow through the two tubes will be observed. This difference in flow is indicated by differential flowmeter 81.

The apparatus shown in Fig. 7 differs somewhat from that shown in the previous illustrations. A tapered tube 96 is employed and within the tube are two floats 97 and 98 having different weights. The material entering through pipe 99 is pumped by constant volume pump 101 upwardly through the tube 96, and out through the discharge 102. Float 97 is in a different rate of shear zone than float 98 so that as consistency of the product changes, the distance between the floats 97 and 98 changes. The height of the respective floats may be read on a height gauge 103 or the distance between the two floats may be measured electrically as indicated generally by electric gauge 104 as is well understood in this art. The two floats are similar in shape and are of a shape such that they are sensitive to changes in viscosity and not particularly sensitive to changes in flow. It will be apparent that instead of single tube 96, two separate tubes may be employed (as in Fig. 3) with a float in each tube.

In Fig. 8, a rotational, as distinguished from a capillary, measurement is employed. Two spindles 106 and 107 are driven by motors 108 and 109, the spindles terminating in disks 111 and 112 immersed in a tank 113 connected with the moving stream of fluid entering through pipe 114 and leaving through pipe 116. The two disks 111 and 112 are of different diameters and the two motors 108 and 109 are driven at different speeds, the relationship of the diameters and speeds desirably being such that for a Newtonian liquid the viscous drag on the two spindles is identical. The viscous drag on the spindles is measured by instrument 111a and converted into an electrical impulse as is well understood in this art. Differences in drag indicate differences in consistency. The rotating member may be, in addition to a disk, a cup, cone, or other element which accurately responds to the viscous drag of the fluid.

By any of the apparatuses heretofore described a change in consistency of product continuously passing through a pipe is immediately indicated and by gauge calibration its magnitude can be similarly indicated. The information thus obtained may be used to insure proper consistency of product.

In the accompanying claims the term "zone" is used as more precise than the term "point" commonly used in the art. The word "zone" will be understood to mean a volume of space within the confines of the consistometer apparatus in which fluid conditions are such that the rate of shear stands at one value as compared with another volume of space in the apparatus in which the rate of shear value is different. The term "shear volume" is used as it is more precise than the term "point" commonly used in the art. The words "shear volume" will be understood to mean a three dimensional portion of fluid in flow at which fluid conditions are such that the rate of shear stands at one value as compared with another three dimensional portion of fluid in flow at which the rate of shear value is different.

Although I have described my invention in some detail by way of illustration, it is understood that certain changes and modifications may be practiced within the spirit of the invention and scope of the appended claims.

What is claimed is:

1. A continuous consistometer comprising a conduit through which a fluid flows, first means in fluid communication with said conduit for establishing at least two zones of different rates of shear in the flow of fluid, the viscous resistance at both said zones increasing with increase in consistency, and second means communicating with said first means between said zones for measuring the difference in viscous resistance to shear of the fluid in said zones.

2. A continuous consistometer according to claim 1 in which said zones are established in such relationship that the difference in viscous resistance for a Newtonian fluid is zero.

3. A continuous consistometer according to claim 1 in which said zones are established in parallel branches of flow.

4. A continuous consistometer according to claim 3 in which is provided means for pumping the same quantity of fluid through each branch and said second means comprises means for measuring the difference in pressure in each branch.

5. A continuous consistometer according to claim 3 in which said second means comprises means for measuring the difference in the rate of flow through the two branches.

6. A continuous consistometer according to claim 3 in which the total viscous resistance in each branch is the same for any Newtonian fluid.

7. A continuous consistometer according to claim 1 in which said first means comprises capillary tubes through which said fluid passes.

8. A continuous consistometer according to claim 1 in which said first means comprises rotatable members of different diameters and means for revolving said members at different speeds of rotation.

9. A continuous consistometer according to claim 1 in which said zones are established at different locations in a single line of flow.

10. A continuous consistometer comprising an intake conduit, a first and a second branch leading from said intake conduit, a first capillary tube in said first branch, a second capillary tube in said second branch, said capillaries being of different diameters, pumping means for pumping equal flow through each branch, a pressure differential gauge connected into said branches between said pumping means and said capillaries for measuring the differences in pressure in said first and second branches, and a discharge conduit collecting the discharge of both said capillaries.

11. A continuous consistometer according to claim 10 in which the lengths of said branches is such that for a Newtonian fluid the total viscous resistance of the branches is equal.

12. A consistometer according to claim 10 in which said pumping means comprises a first pump in said first branch and a second pump in said second branch, said pumps being of identical capacity.

13. A consistometer according to claim 10 in which is further provided a third capillary tube in said first branch behind said first tube identical with said second tube and a fourth capillary tube in said second branch behind said second tube identical with said first tube and in which said gauge is connected into said tubes between said first and third tubes and between said second and fourth tubes.

14. A consistometer according to claim 10 in which said tubes are identical tapered tubes mounted in opposite directions and said gauge means is connected into each of said tubes at its median point of viscous resistance for a Newtonian fluid.

15. A continuous consistometer comprising an intake conduit, a pump in said conduit, a first capillary behind said pump, a second capillary behind said first capillary, said capillaries being of different diameters, a discharge conduit behind said second capillary, and a pressure differential gauge for measuring the difference in pressure between the intake of said first tube, the point of juncture of said tubes and the discharge of said second tube.

16. A consistometer according to claim 15 in which the relative lengths of said tubes are such that the total viscous resistance thereof for Newtonian fluids is identical and said gauge reading for Newtonian fluids is zero.

17. A continuous consistometer comprising an intake conduit, a pump in said conduit, a tapered capillary, a discharge conduit, and a gauge for measuring the difference in pressure between the bottom of said tube, a point intermediate the ends thereof, and the top of said tube.

18. A consistometer according to claim 17 in which said point intermediate the ends of said tube is at the median point of viscous resistance for a Newtonian fluid.

19. A continuous consistometer comprising a tapered capillary tube, a first weight, a second weight, said weights being of different mass, and being sensitive to differences in viscosity, means for pumping fluid through said tube, and means for measuring differences in distance between said weights.

20. A continuous consistometer comprising a branch of flow having a plurality of zones of different rates of shear, at least two weights of different mass, said weights being free to move throughout said zones, means for pumping fluid through said branch, and means for measuring differences in the distance between said weights.

21. A continuous consistometer comprising means defining a chamber, means for filling said chamber continuously with fluid under test, a pair of rotatable members rotatable in said chamber, said members being of different diameters, means for separately rotating each of said members and means for measuring the differences in rotational resistance of said members.

22. A continuous consistometer comprising means defining a chamber, means for filling said chamber continuously with fluid under test, a first member, a first spindle on which said first member is mounted, a first motor arranged to drive said first spindle, a second member of different diameter from said first member, a second spindle on which said second member is mounted, a second motor arranged to drive said second spindle, and means for measuring the differences in rotational resistance of said motors.

23. A consistometer according to claim 22 in which the speeds of said first motor and said second motor and the diameters of said first and second members are such that for a Newtonian fluid the rotational resistances of the two motors are the same.

24. A method of continuously measuring the consistency of a substantially continuously flowing non-Newtonian fluid which comprises the steps of: establishing and maintaining a fluid stream of said fluid; confining said fluid stream; shearing said fluid in said stream at a first rate at a first point; shearing said fluid in said stream at a second rate at a second point removed from the point of said first shearing; and measuring the difference in viscous resistance to said first and second shearing.

25. The method of claim 24 in which the measuring of the differences in viscous resistance is accomplished by separately sensing the pressure of the fluid at each of said shear volumes while said fluid is flowing through said shear volumes and is subject to viscous resistance and measuring the difference in pressure at the two shear volumes.

26. A method according to claim 24 in which said flow is divided into two parts and in which said first shearing occurs in the first of said parts and said second shearing occurs in the second of said parts.

27. A method of claim 26 wherein the first said part is equal to the second said part in volume, and said measuring is accomplished by separately sensing the pressure of the fluid at each of said parts while said fluid is flowing past said points and is subject to viscous resistance at said points and measuring the difference in pressure of said first and second parts.

28. The method of claim 26 in which for a Newtonian fluid the difference in pressure of said first and second parts sensed at points equidistant from the origins of said parts is zero.

29. The method of claim 26 in which said measuring is accomplished by measuring the difference in the rate of flow through said first and second parts.

30. The method of claim 29 in which for a Newtonian fluid the flow of said first and second parts is the same.

31. The method of claim 24 in which the measuring is accomplished by suspending weights in said fluid stream at said first and second shear volumes and balancing the weights by the shear reaction of the weights to the fluid passing the weights and the buoyancy of the fluid and by measuring the difference in weight which can be supported at said two shear volumes.

32. The method of claim 24 wherein the distance between said shear volumes is variable and of gradually increasing resistance to said flow and said measuring is performed at first and second shear volumes, suspending weights in said fluid stream at each of said volumes and balancing said weights by the shear reaction of the weights to the fluid passing the weights and the buoyancy of the fluid and measuring the distance between said volumes at which two weights of different mass are held in equilibrium.

33. The method of claim 24 in which said measuring is accomplished by measuring the difference in resistance to rotation at said two shear volumes of a pair of rotatable elements suspended in said fluid and having different viscous resistances relative to said fluid.

34. The method of claim 24 in which said measuring is accomplished by causing rotation in each of said shear volumes and by measuring rotational resistance at a different speed of rotation of each shear volume of a pair of rotatable elements suspended in said fluid and having different viscous resistances relative to said fluid.

References Cited in the file of this patent

UNITED STATES PATENTS

| | | |
|---|---|---|
| 1,669,412 | Zurick | May 25, 1928 |
| 1,770,589 | Cram | July 15, 1930 |
| 1,925,833 | French | Sept. 5, 1933 |
| 2,242,419 | Cowles | May 20, 1941 |
| 2,302,327 | Kehoe et al. | Nov. 7, 1942 |
| 2,491,389 | Norcross | Dec. 13, 1949 |
| 2,630,819 | Norcross | Mar. 10, 1953 |
| 2,700,891 | Shafer | Feb. 1, 1955 |
| 2,716,337 | Fontein | Aug. 30, 1955 |

OTHER REFERENCES

Journal of Applied Physics, vol. 25, No. 1, January 1954, pages 72–75.

Physikalische Zeitschrift, volume 37, No. 14, 1936, pp. 489–492.